United States Patent Office 3,629,432
Patented Dec. 21, 1971

3,629,432
ANTIULCEROGENIC COMPOSITION AND METHODS UTILIZING 2 - AMINOETHANETHIOLSULFURIC ACID
Murray Weiner, White Plains, N.Y., assignor to Geigy Chemical Corporation, Ardsley, N.Y.
No Drawing. Filed Mar. 6, 1968, Ser. No. 710,754
Int. Cl. A61k 15/12
U.S. Cl. 424—273      5 Claims

ABSTRACT OF THE DISCLOSURE 2-aminoethanethiolsulfuric acid is antiulcerogenic.

---

The present invention relates to a method for counteracting ulcerogenic effects. More particularly, this invention pertains to the discovery that 2-aminoethanethiolsulfuric acid has a significant antiulcerogenic effect.

DETAILED DESCRIPTION

While etiology of peptic ulcers in animals is not fully understood at the present time, it is known that various chemical substances, when given at sufficiently high levels or over a sufficient period of time, can cause peptic ulcers or aggravate existing ulcers. While many of these ulcerogenic substances have no therapeutic use, others are used widely. Thus, for example, phenylbutazone and oxyphenbutazone are potent nonsteroidal anti-inflammatory agents but are contraindictated in patients with symptoms or history of ulcers because of their potential ulcerogenic properties.

It has been discovered that 2-aminoethanethiolsulfuric acid has a definite antiulcerogenic effect and that the substance thus has value as an adjuvant to other therapeutics which are, or have the potential of being ulcerogenic. This effect is observed in the range of from about 50 to about 500 mg./kg. of body weight, although since the therapeutic use of 2-aminoethanethiolsulfuric acid is dependent on the use of a primary therapeutic, the ulcerogenic agent, the dose of 2-aminoethanethiolsulfuric acid will necessarily be dependent on the nature and dose of the primary therapeutic itself. For an agent such as phenylbutazone or oxyphenbutazone, for example, the dose of 2-aminoethanethiolsulfuric acid is generally from about one-fifth to two and a half times the amount, on a weight basis; e.g., 20 to 250 mg. of 2-aminoethanethiolsulfuric acid for each of 100 mg. of phenylbutazone. While individual dosage units of 2-aminoethanethiolsulfuric acid are contemplated, the agent is preferably admixed with the primary therapeutic in suitable pharmaceutical dosage forms. These can be prepared via conventional techniques, following the known and usual formulations for the primary therapeutic. For example, the active ingredients such as oxyphenbutazone or phenylbutazone and 2-aminoethanethiolsulfuric acid are mixed with an inert carrier such as lactose and introduced into a gelatin sheath or capsule. In view of the increased total volume, it is often advantageous to divide the dosage into several dosage units. Because of the reduction of ulcerogenic effects which is observed with the present invention, the opportunity to utilize additional therapeutics which themselves have some ulcerogenic tendencies, such as aspirin or anti-inflammatory steroids, e.g., prednisone, in combination with the primary therapeutic is greatly increased. Additional agents, which reduce ulcerogenic effects, such as antacids such as aluminum hydroxide or magnesium trisilicate or parasympatholytics such as homatropine can also be included to the extent they are compatible with the primary therapeutic.

The antiulcerogenic agent of the present invention appears to be of low toxicity, e.g., an $LD_{50}$ of 2250 mg./kg. in rats and 4600 mg./kg. in mice. It not only is free from serious side effects, it appears to advantageously possess some anti-inflammatory activity.

Ethical considerations in general preclude the direct study of ulcerogenic agents in man since controlled, standardized baselines of ulceration obviously cannot be established. Fortunately, reliable models in laboratory animals known to be closely correlated to human conditions provide a convenient and suitable method for the study and evaluation of such agents. It is thus known, for example, that phenylbutazone is associated with peptic ulcer and reactivation of latent peptic ulcer in man, particularly upon prolonged use. It has been demonstrated that ulceration of the stomach can in fact be caused in the laboratory animal through administration of large doses of phenylbutazone. Thus, upon administration of large doses of phenylbutazone over a series of days, petechiasis, erosion or frank ulceration of the stomach and pyloric ridge develop. Similar responses can be evoked with other ulcerogenic agents but in view of the therapeutic value of phenylbutazone and oxyphenbutazone as anti-inflammatory agents, the reduction of their ulcerogenic properties is of singular importance.

The laboratory animal found to be most satisfactory is the rat. These are preconditioned for diurnal feeding and the ulcerogenic agent is administered per os in 3% cornstarch on each morning for four days. Food is presented 30 minutes after the challenge and removed at the end of the day. The animals are starved on the final day until they are sacrificed (5 hours post treatment).

Table I demonstrates the consistently high incidence of ulceration observed with animals thus treated with phenylbutazone. Above doses of 50 mg./kg., evidence of ulceration can be seen, whereas at a dose of 150 mg./kg., a 70% incidence of ulceration is observed.

TABLE I.—EFFECT OF PHENYLBUTAZONE

| Dose, mg./kg./4 days | Number rats | Ulcer [1] index | Percent incidence of ulceration |
|---|---|---|---|
| Non-treated | 4 | 5.0 | 0 |
| Vehicle (5 ml./kg.) | 12 | 6.7 | 0 |
| 50 | 4 | 4.0 | 0 |
| 100 | 4 | 6.5 | 25 |
| 150 | 10 | 13.2 | 70 |
| 200 | 10 | 16.0 | 100 |
| 250 | 37 | 15.7 | 91.9 |
| 400 [2] | 5 | 16.0 | 100 |

([1]) Ulcer index: Hyperemia and/or scattered petechiae=2, Numerous petechia=4, Erosion=8, Ulcer=16.
([2]) Sacrificed 8 hours after 2d dose, at which time there had been 1 mortality. Ulcers in all 4 surviving rats.

By comparison, 2-aminoethanethiolsulfuric acid is completely nonulcerogenic at these levels in this test as is shown in Table II.

TABLE II.—EFFECT OF 2-AMINOETHANETHIOLSULFURIC ACID

| Dose, mg./kg./4 days | Number rats | Ulcer index | Percent incidence of ulceration |
|---|---|---|---|
| 100 | 5 | 3.2 | 0 |
| 250 | 6 | 3.0 | 0 |

The consistently high and reproducible level of ulceration caused by doses of from 200 to 400 mg./kg. of phenylbutazone can be reduced according to the present invention by administering a 2-aminoethanethiolsulfuric acid in admixture with the phenylbutazone. The amount of the antiulcerogenic agent depends on the dose of the primary therapeutic. For example, when varying amounts of 2-aminoethanesulfuric acid are combined with 250 mg./kg. of phenylbutazone, protection is seen from 50 mg./kg. to 500 mg./kg. This is depicted in Table III.

TABLE III.—DOSE RESPONSE OF 2-AMINOETHANETHIOL-SULFURIC ACID TO 250 MG./KG. PHENYLBUTAZONE

| Dose of 2-aminoethane-thiolsulfuric acid, mg./kg./4 days | Number rats | Ulcer index | Percent incidence of ulceration |
|---|---|---|---|
| 0 | 5 | 14.4 | 80 |
| 25 | 5 | 13.6 | 80 |
| 50 | 5 | 10.4 | 40 |
| 100 | 5 | 10.4 | 40 |
| 250 | 5 | 9.6 | 40 |
| 500 | 5 | 12.0 | 60 |

Since the dose protection response of 2-aminoethanethiolsulfuric acid is dependent on the dose of the ulcerogenic agent, a reduction in the amounts of the ulcerogenic agent increases the percent protection for a constant dose of 2-aminoethanethiosulfuric acid. Thus in Table IV decreasing the dosage of phenylbutazone from 250 to 200 and then to 150 mg./kg. while holding the dosage of 2-aminoethanethiolsulfuric acid constant at 250 mg./kg. results in an increase in protection (vis a vis the corresponding results in Table I) of 38.7%, 58.3% and 64.3% respectively.

TABLE IV.—DOSE EFFECT OF PHENYLBUTAZONE WITH 250 MG./KG. 2-AMINOETHANETHIOLSULFURIC ACID

| Dose, mg./kg. | Number rats | Ulcer index | Percent incidence of ulceration |
|---|---|---|---|
| 250 | 32 | 11.3 | 56.3 |
| 200 | 12 | 10.3 | 41.7 |
| 150 | 12 | 7.5 | 25.0 |

In addition to gross observation of the stomach and pyloric ridge area upon sacrifice, 2-aminoethanethiolsulfuric acid also has an effect on body weight loss upon administration of phenylbutazone as seen from Table V:

TABLE V.—EFFECT ON BODY WEIGHT

| Phenylbutazone, mg./kg. | 2-aminoethane-thiosulfuric acid, mg./kg. | Number of animals | Percent change in body weight |
|---|---|---|---|
| 0 | 0 | 5 | +2.65 |
| 150 | 0 | 6 | −4.63 |
| 150 | 250 | 12 | −3.15 |
| 200 | 0 | 6 | −8.97 |
| 200 | 250 | 12 | −6.25 |
| 250 | 0 | 6 | −9.79 |
| 250 | 250 | 6 | −3.53 |

It is to be appreciated that the pharmacology and indications for the primary therapeutic are unchanged by the present invention. No substantial deviation from compositions which have been used for the primary therapeutics is necessary. Illustrative formulations are as follows:

EXAMPLE 1 g./100 tablets

Phenylbutazone _____ 100.0
2-aminoethanethiolsulfuric acid _____ 200.0
Gelatin _____ 9.0
Corn starch _____ 14.0
Magnesium stearate _____ 1.8
Talc _____ 10.0

334.0

Blend the phenylbutazone and the 2-aminoethane thiolsulfuric acid in a suitable mixer. Granulate with an aqueous solution of the gelatin. Dry the granulation and add the balance of the ingredients to the sized granulation. The material is now ready for compression into tablets. The tablets may be coated by any convetional tablet coating procedure if desired.

EXAMPLE 2

G./100 tablets

Phenylbutazone _____ 100.0
2-aminoethanethiolsulfuric acid _____ 500.0
Gelatin _____ 18.0
Cornstarch _____ 42.0
Magnesium _____ 3.6
Talc _____ 20.0

683.6

Blend the phenylbutazone and the 2-aminoethanethiolsulfuric acid in a suitable mixer. Granulate with an aqueous solution of the gelatin. Dry the granulation and add the balance of the ingredients to the sized granulation. The material is now ready for compression into tablets. The tablets may be coated by any conventional tablet coating procedure if desired.

EXAMPLE 3

G./100 tablets

Phenylbutazone _____ 100.0
2-aminoethanethiolsulfuric acid _____ 200.0
Lactose _____ 75.0
Magnesium stearate _____ 4.0

379.0

The powders are blended together in a suitable mixer and encapsulated.

EXAMPLE 4

G./100 tablets

Phenylbutazone _____ 100.0
2-aminoethanethiolsulfuric acid _____ 500.0
Lactose _____ 180.0
Magnesium stearate _____ 6.00

786.0

The powders are blended together in a suitable mixer and encapsulated.

The above description of the invention has been presented with particular reference to the preferred embodiment but it should be understood that variations and modifications can be effected without departing from the essence of the invention as described herein and the following claims.

What is claimed is:

1. The method of reducing ulcerogenic effects in animals upon oral administration of therapeutic agents having an ulcerogenic potential which comprises orally administering to said animal an antiulcerogenic amount of 2-aminoethanethiolsulfuric acid.

2. The method of claim 1 wherein the amount of 2-aminoethanethiolsulfuric acid is from about 50 to about 500 mg./kg.

3. The method of reducing ulcerogenic effects of phenylbutazone or oxyphenbutazone upon administration to animals which comprises administering to said animal with said phenylbutazone or oxyphenbutazone from about one-fifth to about two and one half times an amount of 2-aminoethanethiolsulfuric acid.

4. An anti-inflammatory composition comprising phenylbutazone or oxyphenbutazone in an anti-inflammatory dose and a quantity of 2-aminoethanethiolsulfuric acid sufficient to reduce the ulcerogenic effects of said dose of phenylbutazone or oxyphenbutazone.

5. A composition according to claim 4 wherein the amount of 2-aminoethanethiolsulfuric acid is from about one-fifth to about two and a half times the amount of phenylbutazone or oxyphenbutazone.

(References on following page)

References Cited

UNITED STATES PATENTS 3,051,626  8/1962  Rao ............... 424—315

OTHER REFERENCES

Chemical Abstracts, vol. 58, 1963, pages 9040–9042.
Chemical Abstracts, vol. 66, 1967, page 4970 (52777r, s, and t).

The Merck Index, 7th edition, 1960, pages 800–801.

ALBERT T. MEYERS, Primary Examiner

D. M. STEPHENS, Assistant Examiner

U.S. Cl. X.R.

424—315